(12) United States Patent
Vegas Olmos et al.

(10) Patent No.: US 10,523,471 B2
(45) Date of Patent: Dec. 31, 2019

(54) LOOK AHEAD BASED METHOD AND APPARATUS FOR EQUALIZING PULSE AMPLITUDE MODULATION ELECTRONIC SIGNALS

(71) Applicant: Mellanox Technologies Denmark ApS., Roskilde (DK)

(72) Inventors: Juan Jose Vegas Olmos, Søborg (DK); Thorkild Franck, Roskilde (DK); Anders Nejdel, Vellinge (SE); Steen Christensen, Roskilde (DK)

(73) Assignee: MELLANOX TECHNOLOGIES DENMARK APS., Roskilde (DK)

( * ) Notice: Subject to any disclaimer, the term of this patent is extended or adjusted under 35 U.S.C. 154(b) by 0 days.

(21) Appl. No.: 15/941,831

(22) Filed: Mar. 30, 2018

(65) Prior Publication Data
US 2019/0305992 A1    Oct. 3, 2019

(51) Int. Cl.
*H04L 25/03*    (2006.01)
*H04L 27/06*    (2006.01)

(52) U.S. Cl.
CPC ........ *H04L 25/03057* (2013.01); *H04L 27/06* (2013.01)

(58) Field of Classification Search
CPC ................................................. H04L 25/03057
USPC ......................................................... 375/233
See application file for complete search history.

(56) References Cited

U.S. PATENT DOCUMENTS

| | | | |
|---|---|---|---|
| 7,239,652 B2 * | 7/2007 | Parhi ....................... | H04J 3/047 370/535 |
| 9,184,906 B1 * | 11/2015 | Min ...................... | H04L 7/0058 |
| 9,742,597 B1 * | 8/2017 | Chang ............... | H04L 25/03057 |
| 9,800,435 B1 * | 10/2017 | Ho .................... | H04L 25/03146 |
| 2016/0065396 A1 * | 3/2016 | Chan ................. | H04L 25/03057 375/233 |

* cited by examiner

*Primary Examiner* — Lihong Yu
(74) *Attorney, Agent, or Firm* — Alston & Bird LLP (57) ABSTRACT

Embodiments are disclosed for equalizing a pulse amplitude modulation signal for a receiver in a communication system. An example method includes receiving an electronic signal. The electronic signal encodes a plurality of symbols in a number of amplitude levels in a plurality of pulses in the electronic signal. The example method further includes estimating multiple symbol values using all possible values of an immediately preceding symbol for each symbol in the electronic signal. Each estimated symbol value is determined using one of the possible values of the immediately preceding symbol. The example method further includes receiving an actual value of the immediately preceding symbol and selecting an actual estimated symbol value from the multiple symbol values based on the actual value of the immediately preceding symbol. The actual estimated symbol value may be used as the actual value for selecting an estimated symbol value of an immediately subsequent symbol.

20 Claims, 7 Drawing Sheets

LOOK AHEAD BASED METHOD AND APPARATUS FOR EQUALIZING PULSE AMPLITUDE MODULATION ELECTRONIC SIGNALS

TECHNOLOGICAL FIELD

Embodiments of the present invention relate generally to a look ahead decision equalizer used for equalizing a pulse amplitude modulation ("PAM") signal such as a PAM-2 (non-return to zero) and a PAM-4 electronic signal.

BACKGROUND

The present invention relates to a look ahead based decision equalizer for equalizing a pulse amplitude modulation electronic signal and corresponding methods. Communication systems are composed of a transmitter, a receiver, and a channel. The transmitter generates an electronic signal conveying information, which, after being transmitted over a channel, is received and recovered. The signal typically experiences distortion in the form of changes in the amplitude and/or the phase during the transmission process. Therefore, the signal typically needs to be equalized at the receiver to overcome the distortion effects.

BRIEF SUMMARY

Example embodiments described herein disclose a look ahead based equalizing method for pulse amplitude modulation electronic signals. The details of some embodiments of the subject matter described in this specification are set forth in the accompanying drawings and the description below. Other features, aspects, and advantages of the subject matter will become apparent from the description, the drawings, and the claims.

In accordance with an example embodiment, a method for equalizing a pulse amplitude modulation signal for a receiver in a communication system is provided. The method includes receiving an electronic signal. The electronic signal encodes a plurality of symbols in a number of amplitude levels in a plurality of pulses in the electronic signal. The method further includes for each symbol: estimating multiple symbol values using all possible values of an immediately preceding symbol; each estimated symbol value is determined using one of the possible values of the immediately preceding symbol; receiving an actual value of the immediately preceding symbol, and selecting an actual estimated symbol value from the multiple symbol values based on the actual value of the immediately preceding symbol.

In some embodiments, the electronic signal is a pulse amplitude modulation signal encoding the plurality of symbols in four amplitude levels, and the four amplitude levels denote 0, 1, 2, and 3.

In some embodiments, the method further includes for each symbol: estimating a symbol value based on the assumption that the value of the immediately preceding symbol of the symbol is 0; estimating a symbol value based on the assumption that the value of the immediately preceding symbol of the symbol is 1; estimating a symbol value in the electronic signal based on the assumption that the value of the immediately preceding symbol of the symbol is 2; estimating a symbol value in the electronic signal based on the assumption that the value of the immediately preceding symbol of the symbol is 3; receiving an actual value of the immediately preceding symbol, the actual value is one of 0, 1, 2, or 3; and selecting an actual estimated symbol value from the multiple symbol values based on the actual value of the immediately preceding symbol.

In some embodiments, estimating each of the multiple symbol values comprises using a flip flop.

In some embodiments, estimating multiple symbol values using all possible values of an immediately preceding symbol is done in parallel, and a distinct flip flop is used for estimating multiple symbol values.

In some embodiments, selecting the estimated symbol value comprises using a multiplexer.

In some embodiments, the actual estimated symbol value is used as the actual value for selecting an estimated symbol value of an immediately subsequent symbol.

In some embodiments, the electronic signal is a non-return to zero signal.

In some embodiments, the electronic signal is generated by a feed-forward equalizer based on another electronic signal.

In some embodiments, the electronic signal is generated based on an analog electronic signal using a thermometer to binary converter; the analog signal comprises a plurality of eyes, each eye encoding a plurality of symbols; and symbols from each eye are equalized separately.

In another example embodiment, an apparatus for equalizing a pulse amplitude modulation signal for a receiver in an electronic communication system is provided. The apparatus is configured to receiving an electronic signal. The electronic signal encodes a plurality of symbols in a number of amplitude levels in a plurality of pulses in the electronic signal. The apparatus is further configured to for each symbol: estimating multiple symbol values using all possible values of an immediately preceding symbol, each estimated symbol value is determined using one of the possible values of the immediately preceding symbol; receiving an actual value of the immediately preceding symbol; and selecting an actual estimated symbol value from the multiple symbol values based on the actual value of the immediately preceding symbol.

In some embodiments, the electronic signal is a pulse amplitude modulation signal encoding the plurality of symbols in four amplitude levels, and the four amplitude levels denote 0, 1, 2, and 3.

In some embodiments, the apparatus is further configured to estimating a symbol value based on the assumption that the value of the immediately preceding symbol of the symbol is 0; estimating a symbol value based on the assumption that the value of the immediately preceding symbol of the symbol is 1; estimating a symbol value in the electronic signal based on the assumption that the value of the immediately preceding symbol of the symbol is 2; estimating a symbol value in the electronic signal based on the assumption that the value of the immediately preceding symbol of the symbol is 3; receiving an actual value of the immediately preceding symbol, the actual value is one of 0, 1, 2, and 3; and selecting an estimated symbol value from the multiple symbol values based on the actual value of the immediately preceding symbol.

In some embodiments, the apparatus comprises a plurality of flip flops, and the estimating uses flip flops.

In some embodiments, estimating multiple symbol values using all possible values of an immediately preceding symbol is done in parallel, and a distinct flip flop and a distinct summer is used for estimating multiple symbol values.

In some embodiments, the apparatus comprises a multiplexer, and the multiplexer is used in the selecting.

In some embodiments, the actual estimated symbol value is used as the actual value for selecting an estimated symbol value of an immediately subsequent symbol.

In some embodiments, the electronic signal is a non-return to zero signal.

In some embodiments, the apparatus of further comprises a feed-forward equalizer, and the electronic signal is generated by the feed-forward equalizer based on another electronic signal.

In some embodiments, the apparatus further comprises an analog signal receiver, a thermometer to binary converter, the electronic signal is generated based on an analog electronic signal received by the analog signal receiver using the thermometer to binary converter, the analog signal comprises a plurality of eyes that each encode a plurality of symbols, and symbols from each eye is equalized separately.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Having thus described the disclosure in general terms, reference will now be made to the accompanying drawings, which are not necessarily drawn to scale, and wherein:

DETAILED DESCRIPTION

Example embodiments will now be described more fully hereinafter with reference to the accompanying drawings, in which some, but not all, embodiments are shown. Indeed, the embodiments may take many different forms and should not be construed as limited to the embodiments set forth herein; rather, these embodiments are provided so that this disclosure will satisfy applicable legal requirements. Like reference numerals refer to like elements throughout. The term "exemplary," as may be used herein, is not provided to convey any qualitative assessment, but instead merely to convey an illustration of an example. Thus, use of any such terms should not be taken to limit the spirit and scope of embodiments of the present invention.

Communication systems generally include a transmitter, a receiver, and a channel. The transmitter generates a signal conveying information, which, after being transmitted over a channel, is received and recovered at the receiver. The signal generated can be an optical or an electronic signal. The channel can be a copper transmission line or an optical fiber. If the transmitted signal is an optical signal, the receiver may convert the transmitted signal to an electronic signal if the transmitted signal is not an electronic signal. Current communication systems for short-range interconnects employ mainly two level non-return to zero ("NRZ", also known as pulse amplitude modulation 2) or four level pulse amplitude modulation 4 (PAM-4) to encode the information in the signal.

In the real world, transmission channels are non-ideal and introduce various unwanted effects that cause distortion of the electronic signals, making the electronic communication less reliable. For example, the channel may have a transfer function that introduce changes in the signal transmitted over in the form of amplitude and/or phase change. These changes distort the signal received at the receiver. Moreover, during transmission, inter-symbol interference ("ISI") may occur. ISI is a form of distortion of a signal in which one symbol interferes with preceding (pre-cursor) and subsequent (post-cursor) symbols. The presence of the ISI makes the communication less reliable. In addition, the transmission channel may also distort the signal by attenuating higher frequencies more than lower frequencies. All of these unwanted effects distort the signal in the transmission process. Therefore, the signal needs to be equalized at the receiver to overcome these unwanted effects to accurately reconstruct the information encoded in the signal. If the transmitted signal received at the receiver is an electronic signal, equalizations are typically directly performed on the transmitted signal received. If the transmitted signal received at the receiver is not an electronic signal (for example optical signal), equalizations are typically performed after the transmitted signal received is converted to an electronic signal.

Traditionally, two strategies have been employed to overcome the effects introduced by the non-ideal transmission channel. Feed-forward equalizers (FFE), which are digital finite impulse response (FIR) implementations, can help equalize pre- and post-cursors of a symbol. Decision Feedback Equalizers (DFE) can help equalize post-cursors of a symbol. FFEs provide an effective method to invert the channel's low pass nature; however, they can also amplify noise and crosstalk (i.e., the transfer of electronic signals in one channel having an effect on electronic signals of another channel, which are profoundly critical in systems where several transmission channels operate in parallel).

DFEs equalize post-cursors of a symbol and generally do not amplify noise or crosstalk, but DFEs place stringent requirements on hardware processing speed. DFEs use detected symbols to produce an estimate of the channel output. Because DFEs need to conduct a set of applications to properly discern the following symbol of a stream based on the value of the current symbol, all the operations for a single symbol need to be executed sequentially within a single unit interval (UI). This places a stringent timing requirement in the implementation and becomes a technology challenge in communication systems supporting bitrates of 28 Gbit/s and higher.

Embodiments of the present invention represents an improvement over conventional DFEs by taking out the estimation process and placing it together with the equalization process. Accordingly, the present invention estimates multiple symbol values of a current symbol based on all possible values of the immediately preceding symbol. The estimations of the multiple symbol values are conducted in parallel. A symbol value is then selected from the multiple symbol values based on the actual value of the immediately preceding symbol. For example, for a symbol in a PAM-4 electronic signal, four estimated symbol values will be calculated based on four different assumptions (e.g., assuming the immediately preceding symbol is 0, 1, 2, and 3). Then the actual value of the immediately preceding symbol value will be used to select one of the estimated values of the current symbol from the four estimated symbol values. For example, if the equalizer determines that the immediately preceding symbol is 1, the estimated symbol value calculated based on the assumption that the immediately preceding symbol is 1 will be selected. The selected estimated symbol value is an actual estimated symbol value. The selected symbol value might be fed into another equalizer that performs further equalization operations. Therefore, embodiments of this invention remove the estimation process from the equalization process; the estimation and equalization can thus be done in parallel; and the estimation of multiple symbols can be done in parallel. This approach is referenced herein as a look ahead decision equalizer because the estimated symbol values are estimated presently to be used in the future.

Embodiments of the invention can be used in conjunction with a traditional feed forward equalizer ("FFE"). One example method of using embodiments of the present invention in conjunction with a traditional FFE is by equalizing the signal using the FFE first and then feeding the result of the FFE into a look ahead decision equalizer. Alternatively, the present invention can operate without the FFE. If the ISI is relatively high, the extra gain in the form of decreased bit error rate by adding an FFE would be relatively large. If the ISI is relatively low, the extra gain in the form of decreased bit error rate by adding an FFE would be relatively small.

Figure 1:
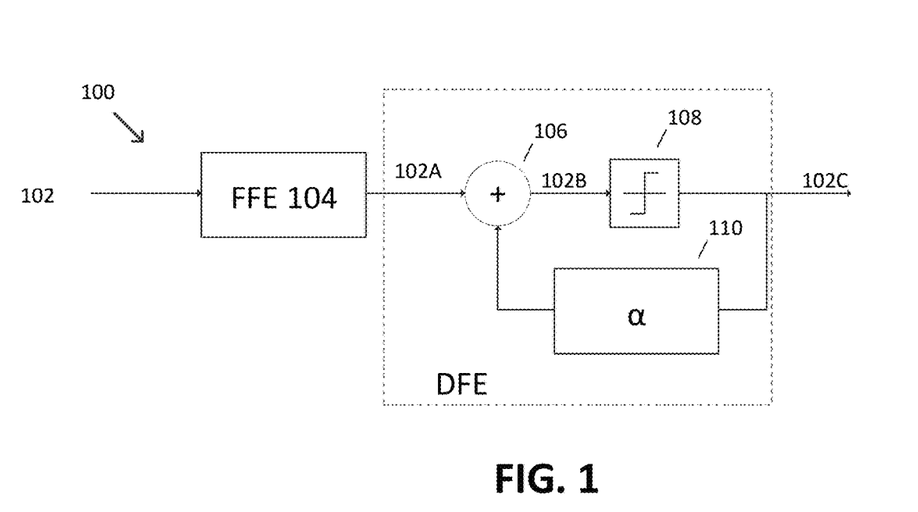
FIG. 1 illustrates a block diagram of a traditional equalizer implemented with a traditional decision feedback equalizer and feed-forward equalizer.

FIG. 1 illustrates a block diagram of an equalizer 100 for an NRZ electronic signal implemented with traditional 1-tap decision feedback equalizer. In FIG. 1, an electronic signal 102 is input into the equalizer 100. The electronic signal 102 is an NRZ electronic signal. In this example, the electronic signal 102 is first fed into an FFE 104 before being fed into a DFE. The FFE 104 may employ a finite impulse response filter with a series of tap weights programmed to adjust the impulse and frequency response of the electronic signal 102.

After being processed by the FFE 104, the resulting electronic signal 102A is fed into a summer 106 of the DFE. The summer 106 receives the electronic signal 102A and the result of the feedback filter 110 as input and produces an electronic signal 102B as output. In this example, the summer 106 adds the result of the feedback filter 110 and the electronic signal 102A to generate the electronic signal 102B.

The electronic signal 102B is then fed into a decision device 108 as input. The decision device 108 then outputs an electronic signal 102C. The decision device 108 may be configured to identify information encoded in the electronic signal 102B. The decision device 108 may also be configured to use various filters, functions, and algorithms to process the electronic signal 102B and generate the electronic signal 102C. The electronic signal 102C is fed into a feedback filter 110 as input. The feedback filter may process the electronic signal 102C and feed the output back to the summer 106. The summer 106, the decision device 108, and the feedback filter 110 collectively form a traditional DFE.

The traditional DFE illustrated in FIG. 1 performs the operation of the summer 106, the operation of the decision device 108, and the operation of the feedback filter 110 sequentially. Thus, the traditional DFE has to complete the entire operation of the summer 106, the decision device 108, and the feedback filter 110 for one symbol before proceeding to equalize the next symbol in the electronic signal. As a result, the traditional approach places stringent requirements on timing. For an electronic communication system having a high transfer rate (e.g., above 40 Gbit/s), traditional DFEs may not be able to process the incoming electronic signal fast enough, making the traditional approach very challenging to implement at high bit rates.

Figure 2:
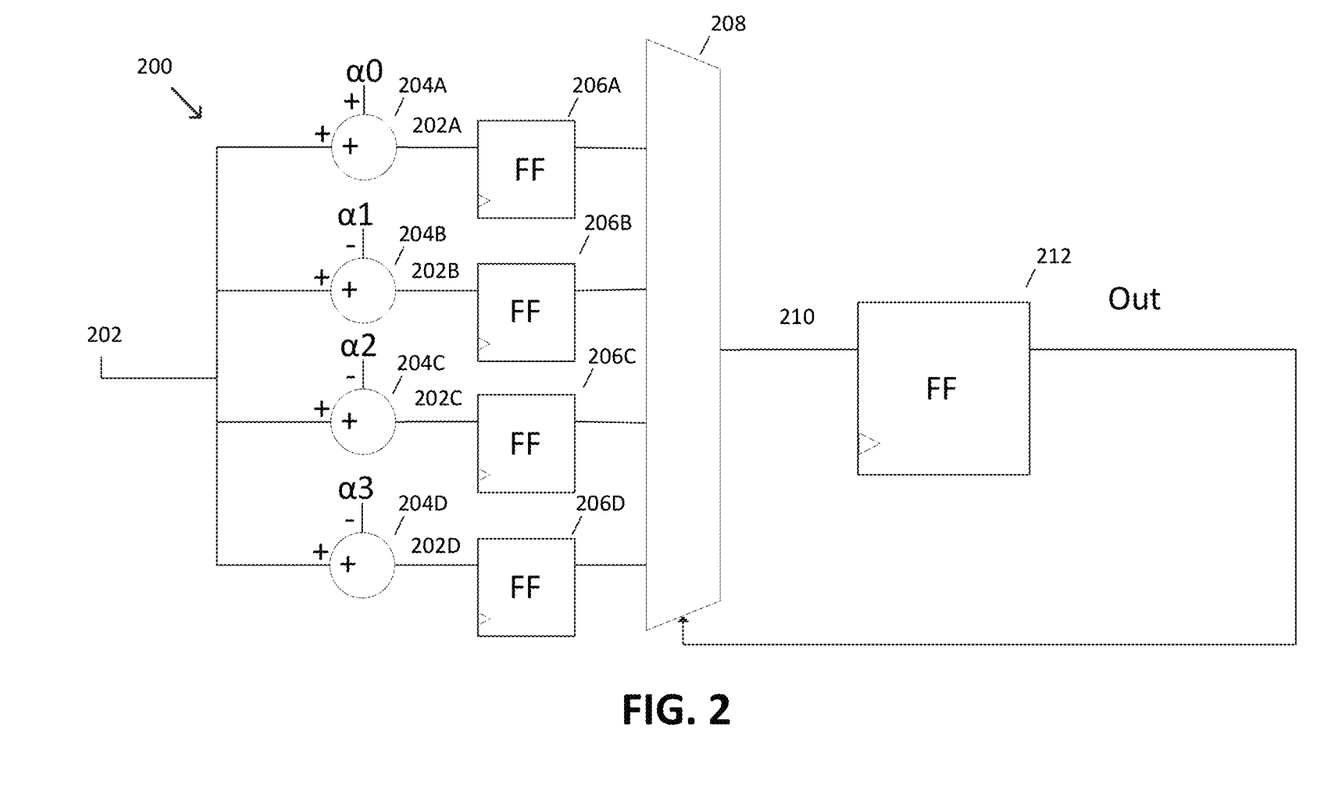
FIG. 2 illustrates a block diagram of a look ahead decision equalizer for PAM-4 electronic signal according to example embodiments of the invention.

FIG. 2 illustrates a block diagram of a look ahead decision equalizer 200 for PAM-4 electronic signals according to example embodiments of the invention that addresses the shortcomings of traditional DFEs such the one illustrated in FIG. 1. In some embodiments, the look ahead decision equalizer 200 receives PAM-4 electronic signal 202 as input. The PAM-4 electronic signal may encode information in the form of amplitude levels that represent 0, 1, 2, and 3. In some embodiments, the PAM-4 electronic signal is converted from an optical signal. According to the depicted embodiment, the electronic signal 202 is fed into four summers 204A, 204B, 204C, and 204D. The summer 204A, for example, receives the electronic signal 202 as input and operates based on the assumption that an immediately preceding symbol for a symbol in the electronic signal 202 is a 0 and, thus, uses $\alpha 0$ as a corrective input. $\alpha 0$ compensates for the value of the signal if the immediately preceding symbol has a symbol value of 0. The summer 204A generates a symbol 202A based on the symbol in the electronic signal 202 and the assumed 0 value of the preceding symbol. Therefore, the summer 204A in this example estimates a symbol value using a symbol in electronic signal 202 and the assumption that the immediately preceding symbol of the symbol being estimated is a 0. This operation may be repeated for each symbol in the electronic signal 202.

$\alpha 0$, $\alpha 1$, $\alpha 2$ and $\alpha 3$ are correction coefficients equaling the amount of ISI from the preceding symbol onto the current symbol, when the preceding symbol has 0, 1, 2 or 3 value, respectively. In some embodiments, the correction coefficients are adjusted based on desired optimization. The desired optimization may be dependent on the medium of the channel in the communication system and performance of other components of the communication system.

Similarly, the summer 204B in FIG. 2 receives the electronic signal 202 as input and operates based on the assumption that an immediately preceding symbol for a symbol in the electronic signal 202 is a 1 and uses $\alpha 1$ as another input. $\alpha 1$ compensates for the value of the signal if the immediately preceding symbol has a symbol value of 1. The summer 204B thus generates a symbol 202B based on the symbol in electronic signal 202 and the assumed value 1. Therefore, the summer 204B estimates a symbol value using a symbol in electronic signal 202 and the assumption that the immediately preceding symbol of the symbol being estimated is a 1. This operation may be repeated for each symbol in the electronic signal 202.

The summer 204C in this example also receives the electronic signal 202 as input and operates based on the assumption that an immediately preceding symbol for a symbol in electronic signal 202 is a 2 and uses α2 as another input. α2 compensates for the value of the signal if the immediately preceding symbol has a symbol value of 2. The summer 204C generates a symbol 202C based on the symbol in electronic signal 202 and the assumed value 2. Therefore, the summer 204C estimates a symbol value using a symbol in electronic signal 202 and the assumption that the immediately preceding symbol of the symbol being estimated is a 2. This operation may be repeated for each symbol in the electronic signal 202.

Finally, the summer 204D receives the electronic signal 202 as input and operates based on the assumption that an immediately preceding symbol for a symbol in electronic signal 202 is a 3 and uses α3 as another input. α3 compensates for the value of the signal if the immediately preceding symbol has a symbol value of 3. The summer 204D generates a symbol 202D based on the symbol in the electronic signal 202 and the assumed value 3. Therefore, the summer 204D estimates a symbol value using a symbol in electronic signal 202 and the assumption that the immediately preceding symbol of the symbol being estimated is a 3. This operation may be repeated for each symbol in the electronic signal 202.

Because the electronic signal 202 is a PAM-4 electronic signal that encodes information as 0, 1, 2, and 3, a symbol in the electronic signal 202 has value of either 0, 1, 2, or 3. Therefore, the operations of summers 204A to 204D collectively cover all possible values of the immediately symbol. The summers 204A to 204D makes four different assumptions about the immediately preceding symbol, and one of these assumptions must be true.

After the summers 204A, 204B, 204C, and 204D generate symbols 202A, 202B, 202C and 202D, respectively, the symbol 202A may be stored in flip flop 206A Similarly, the symbol 202B may be stored in flip flop 206B; the symbol 202C may be stored in flip flop 206C; and the symbol 202D may be stored in flip flop 206D. In some embodiments, the flip flops 206A, 206B, 206C, and 206D may be a D flip flop, a plurality of D flip flops, a sample and hold gate or a plurality of sample and hold gates. Alternatively or additionally, other electronic circuits that are capable of storing an input for at least one clock cycle may be used as 206A, 206B, 206C, and 206D.

A multiplexer 208 may be provided that is configured to select a symbol value from the multiple estimated symbol values in symbols 202A, 202B, 202C, and 202D using the actual value of the immediately preceding symbol. After selecting a symbol value from the multiple symbol values in symbols 202A, 202B, 202C, and 202D, the multiplexer 208 may then output the selected symbol value as an actual estimated symbol value 210. The actual estimated symbol value 210 may subsequently be stored in a flip flop 212. Alternatively or additionally, a plurality of D flip flops or other electronic circuits that are capable of storing an input for at least one clock cycle may be used as component 212. In some embodiments, the flip flop 212 may output the actual estimated symbol value 210 to another equalizer (not shown). The other equalizer may be configured to perform various different types of equalization operations (e.g., by using filters, applying functions and algorithms, and the like).

The flip flop 212 may also feed its output to the multiplexer 208 as the selecting input of the multiplexer 208. The flip flop 212 may store the actual estimated value 210 for one clock cycle. The selecting input of the multiplexer 208 for selecting a symbol value from the multiple estimated symbol values may thus be the actual value of the immediately preceding symbol, as shown in FIG. 2.

In some embodiments, the flip flop 212 does not feed the output to the multiplexer 208 as the selecting input of the multiplexer 208. The selecting input of the multiplexer 208 may, in some cases, be the output of a circuit module not shown in FIG. 2, such as an FFE configured to equalize the immediately preceding symbol. For example, in some embodiments, in a subsampling approach, the multiplexer 208 which determines the value of the symbol N is driven by the outcome of the FFE equalizing symbol N−1.

In some embodiments, the flip flop 212 may be a D flip flop, a plurality of D flip flops, a sample and hold gate or a plurality of sample and hold gates that produces a stream of bits containing the value of the current symbol. In some embodiments, the output of the flip flop 212 and the look ahead decision equalizer 200 consists of a plurality of most significant bits and a plurality of least significant bits. In some embodiments, the output of the output of the flip flop 212 and the look ahead decision equalizer 200 consists of a plurality of high eye symbols, a plurality of mid eye symbols, and a plurality of low eye symbols. The plurality of high eye symbols may correspond to information encoded in high level eye of the eye diagram in FIG. 3A. The plurality of mid eye symbols may correspond to information encoded in mid level eye of the eye diagram in FIG. 3A. The plurality of low eye symbols may correspond to information encoded in low level eye of the eye diagram in FIG. 3A.

The look ahead decision equalizer 200 can be implemented for other types of pulse amplitude modulation signals, such as PAM-2 (NRZ), PAM-6, PAM-8, etc. The number of summers used (and corresponding flip flops) should be the same as the number of pulse amplitude modulation levels. Accordingly, in some embodiments, the multiplexer 208 is configured according to the number of pulse amplitude modulation levels, as well. For example, for a PAM-2 signal, two summers and two corresponding flip flops may be used, and the multiplexer may be a two-to-one multiplexer. For a PAM-8 signal, eight summers and eight corresponding flip flops may be used, and the multiplexer may be an eight-to-one multiplexer.

Figure 3A:
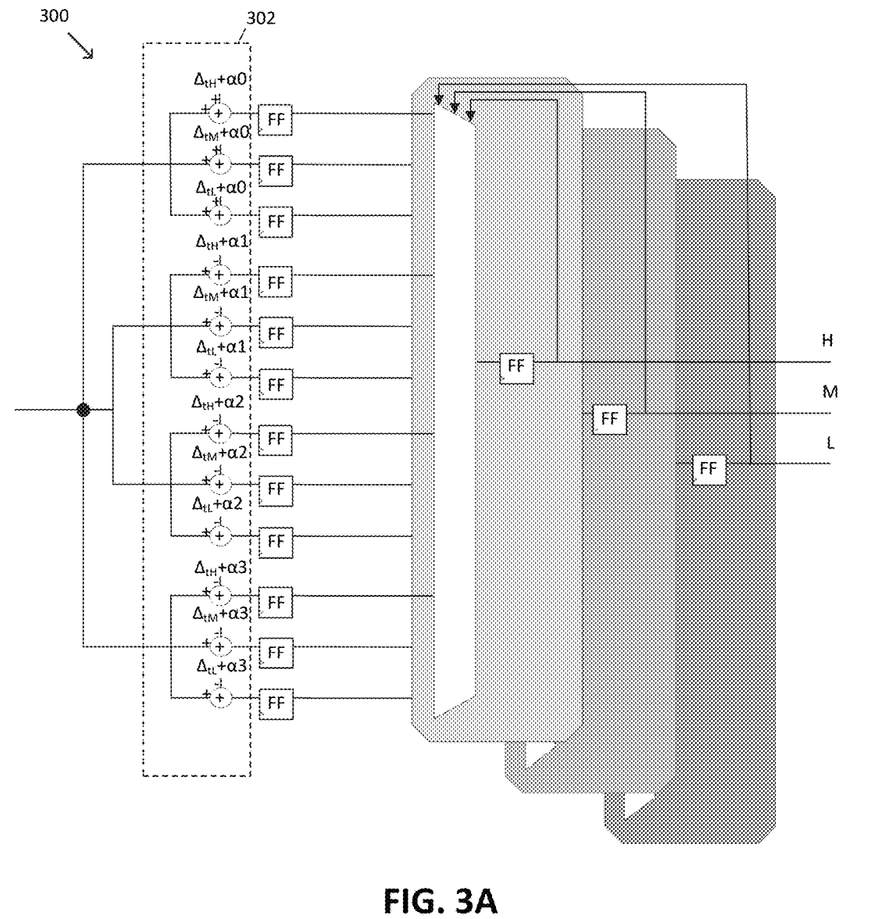
FIG. 3A illustrates a block diagram of a look ahead decision equalizer for PAM-4 electronic signals in a case in which an eye diagram is converted to high, mid and low flow, according to example embodiments of the invention.

FIG. 3A illustrates a block diagram of a look ahead decision equalizer 300 for PAM-4 electronic signals when an eye diagram corresponding to the PAM-4 electronic signal is converted to a high flow, a mid flow, and a low flow components of the signal which correspond to signals generated based on a high level eye, a mid level eye, and low level eye of an eye diagram, according to example embodiments of the invention. Each symbol in each of the high flow, the mid flow and the low flow components is processed using the four possible values of the previous symbol. The operation of the look ahead decision equalizer 300 is similar to the look ahead decision equalizer 200 illustrated in FIG. 2. The summers 302 operates based on various different assumptions of symbol values of the immediately preceding symbol of their respective input symbol and applies different correction coefficients based on the assumptions. Additionally, multiple look ahead decision equalizer 200s, configured as illustrated in FIG. 2, may in some cases be used to construct the look ahead decision equalizer 300. For example, in some embodiments, one look ahead decision equalizer 200 may be used for a high flow portion of the electronic signal; another look ahead decision equalizer 200 may be used for a mid flow portion of the electronic signal;

and yet another look ahead decision equalizer 200 may be used for a low flow portion of the electronic signal.

Figure 3B:
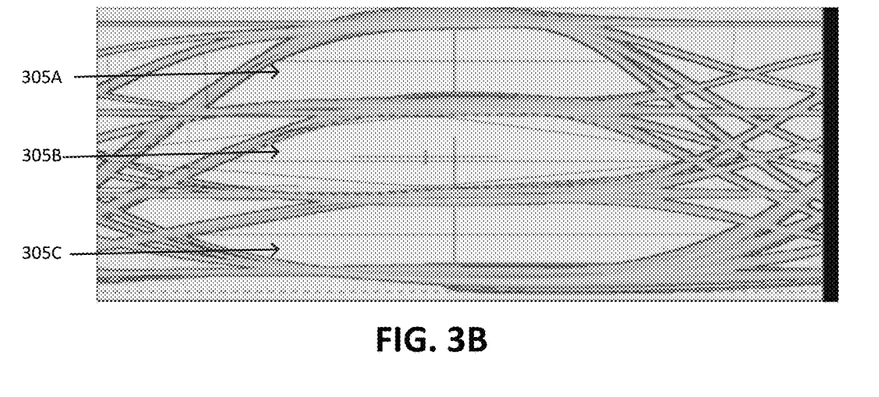
FIG. 3B illustrates an example eye diagram.

FIG. 3B illustrates an example eye diagram. The high flow portion, the mid flow portion, and the low flow portion may correspond to the high level eye 305A, the mid level eye 305B, and the low level eye level eye 305C of the eye diagram illustrated in FIG. 3B. The eye diagram may be generated based on an output of a vertical cavity surface emitting laser ("VCSEL").

Figure 4A:
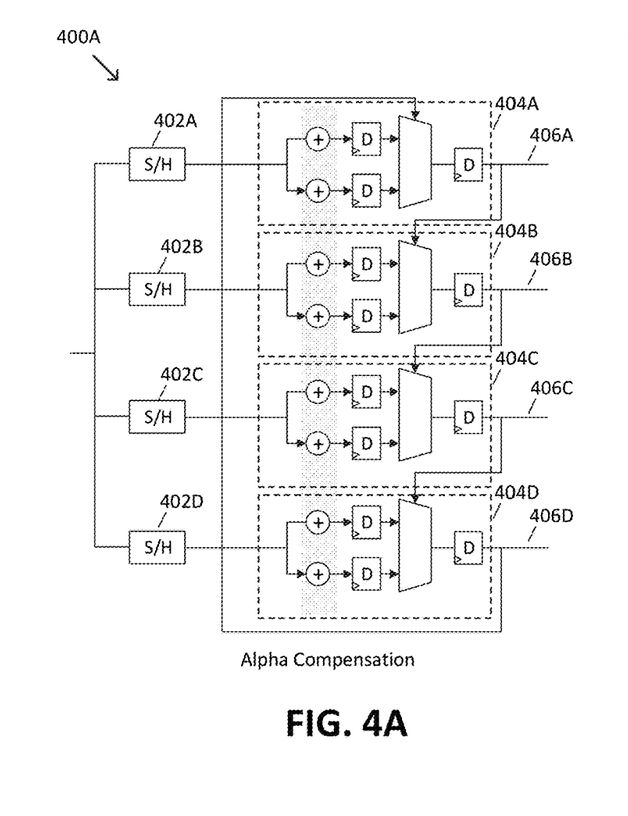
FIGS. 4A and 4B illustrate topologies for processing non-return to zero electronic signals with a look ahead decision equalizer with X4 subsampling applied according to example embodiments of the invention.
Figure 4B:
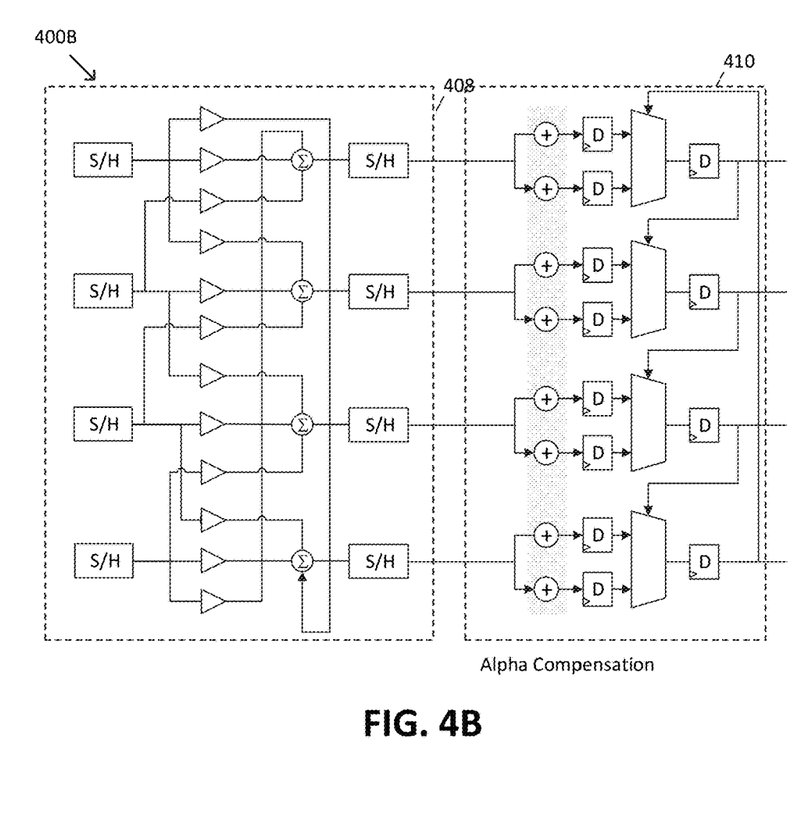

FIGS. 4A and 4B illustrate topologies for processing non-return to zero electronic signals using a look ahead decision equalizer with X4 subsampling applied according to example embodiments of the invention. FIG. 4A illustrates a topology of a system 400A that utilizes a look ahead decision equalizer with X4 subsampling applied to process an NRZ signal. In the depicted embodiment, four sample and hold ("S/H") circuits 402A, 402B, 402C, and 402D are configured to sample the NRZ signal. Four look ahead decision equalizers 404A, 404B, 404C, and 404D are configured to process the output of the sample and hold circuits 402A, 402B, 402C, and 402D to generate output signal 406A, 406B, 406C and 406D.

Figure 5:
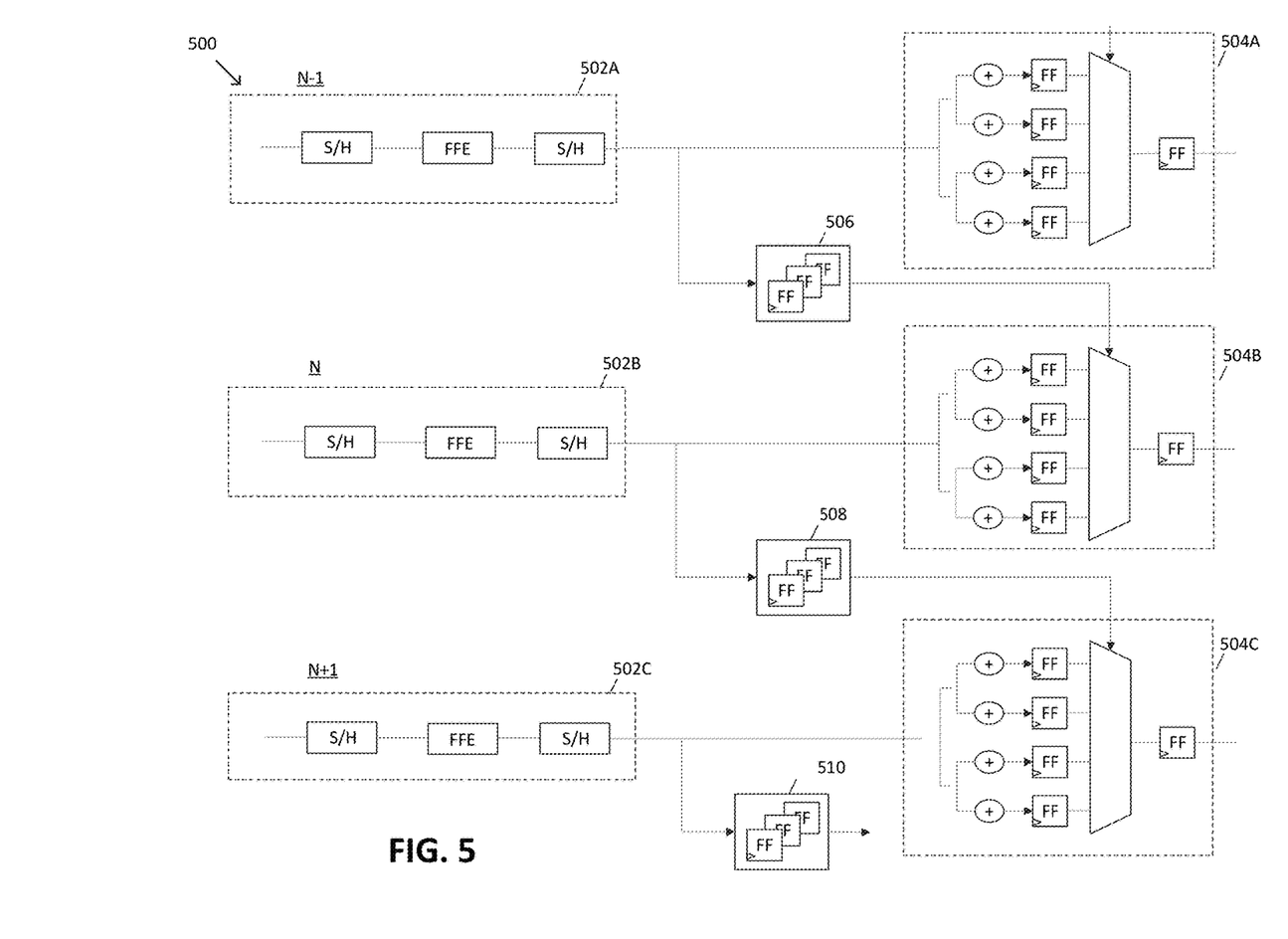
FIG. 5 illustrates a block diagram of a look ahead decision equalizer for PAM-4 electronic signals with a subsampling architecture according to example embodiments of the invention.
Figure 7:
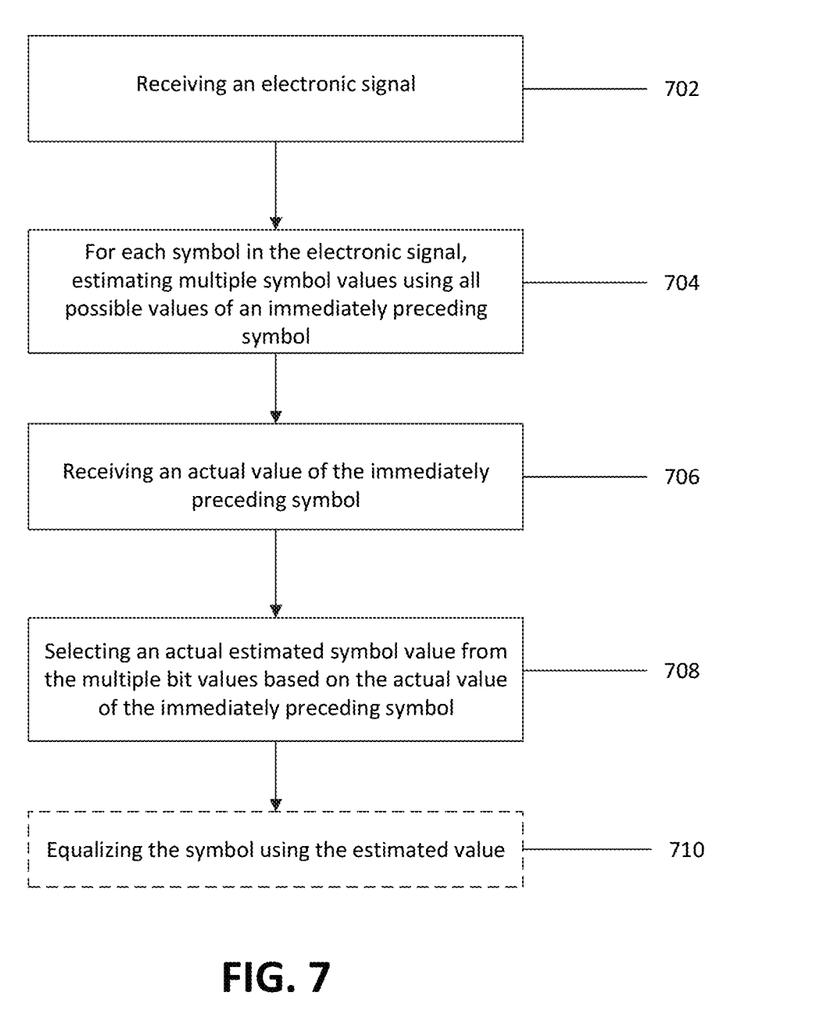
FIG. 7 is a flowchart illustrating an example method of operation of a look ahead decision equalizer according to example embodiments of the invention.

The operation of look ahead decision equalizers 404A to 404D is similar to the operation described in conjunction with FIG. 2, FIG. 5, and FIG. 7. The output signals 406A to 406D are used as the selecting input for a multiplexer in a look ahead decision equalizer 404A to 404D that is not the look ahead decision equalizer that generates the output signal. For example, the output signal 406A may be used as the selecting input for the multiplexer in the look ahead decision equalizer 404B. The output signal 406B may be used as the selecting input for the multiplexer in the look ahead decision equalizer 404C. The output signal 406C may be used as the selecting input for the multiplexer in the look ahead decision equalizer 404D. The output signal 406D may be used as the selecting input for the multiplexer in the look ahead decision equalizer 404A.

Different numbers of the sample and hold circuits 402A-402D and the look ahead decision equalizers 404A to 404B may be utilized depending on the size of the subsampling desired. For example, for an X8 subsampling, eight sample and hold circuits 402 and eight look ahead decision equalizers 404 may be utilized. For an X2 subsampling, two sample and hold circuits 402 and two look ahead decision equalizers 404 may be utilized.

FIG. 4B illustrates a topology of a system 400B that utilizes a 3-tap FFE and look ahead decision equalizer with X4 subsampling applied to process an NRZ signal. The 3-tap FFEs 408 comprise a plurality of 3-tap FFEs that are configured to process an incoming electronic signal. The look ahead decision equalizers 410 comprise a plurality of look ahead decision equalizers. The operation of the look ahead decision equalizers 410 in FIG. 4B are similar to the operation described in conjunction with FIG. 2, FIG. 4A, FIG. 5 and FIG. 7. The number of 3-tap FFEs in the 3-tap FFEs 408 and the number of look ahead decision equalizers in look ahead decision equalizers 410 may be changed depending on the size of the subsampling desired. For example, for an X8 subsampling, the 3-tap FFEs 408 may comprise eight 3-tap FFEs and the look ahead decision equalizers 410 may comprise eight look ahead decision equalizers. In some embodiment, the topology illustrated in FIG. 4B can be extended to other types of signal such as a PAM-4 signal. In addition, the topology illustrated in FIG. 4B can be extended to different number of XN subsampling such as X8 subsampling, X16 subsampling, X32 subsampling, X64 subsampling. Subsampling below X64 are generally preferred.

FIG. 5 illustrates a block diagram of a look ahead decision equalizer for PAM-4 electronic signals with a subsampling architecture according to example embodiments of the invention. In FIG. 5, multiple symbols in an electronic signal are being equalized in parallel. Branch sample and N−1 denotes a branch for evaluating an immediately preceding symbol of a current symbol being equalized in branch N. Branch N+1 denotes a branch for evaluating an immediately subsequent symbol of a current symbol being equalized in branch N. Each branch comprises an FFE 502 and a look ahead decision equalizer 504. In the depicted embodiment, an incoming symbol will be first processed by the FFE 502 then processed by the look ahead decision equalizer 504. The operation of the look ahead decision equalizer 504 is similar to the operation described in conjunction with FIGS. 2 and 7.

The number of branches (and the corresponding FFEs and look ahead decision equalizers) can be expanded. Only three branches are shown in FIG. 5 for illustration purposes.

The output of the FFE 502A is an immediately preceding symbol that may be used as the selecting input of a multiplexer in the look ahead decision equalizer 504B that is configured to equalize a current symbol. The output of FFE 502A may be stored in flip flops 506 before being fed into a multiplexer in the look ahead decision equalizer 504B. The output of FFE 502B may be used as the selecting input of a multiplexer in the look ahead decision equalizer 504C that is configured to equalize an immediately subsequent symbol of the current symbol. The output of FFE 502B may be stored in flip flops 508 before being fed into a multiplexer in the look ahead decision equalizer 504C. Alternatively or additionally, other electronic circuits that are capable of storing an input for at least one clock cycle may be used as components 506 or 508. Similarly, the output of FFE 502B may be stored in flip flops 508 before being fed into a multiplexer in the look ahead decision equalizer 504C and the output of FFE 402C may be stored in flip flops 510 before being fed into a multiplexer in a look ahead decision equalizer in the N+2 branch (Not shown).

Figure 6:
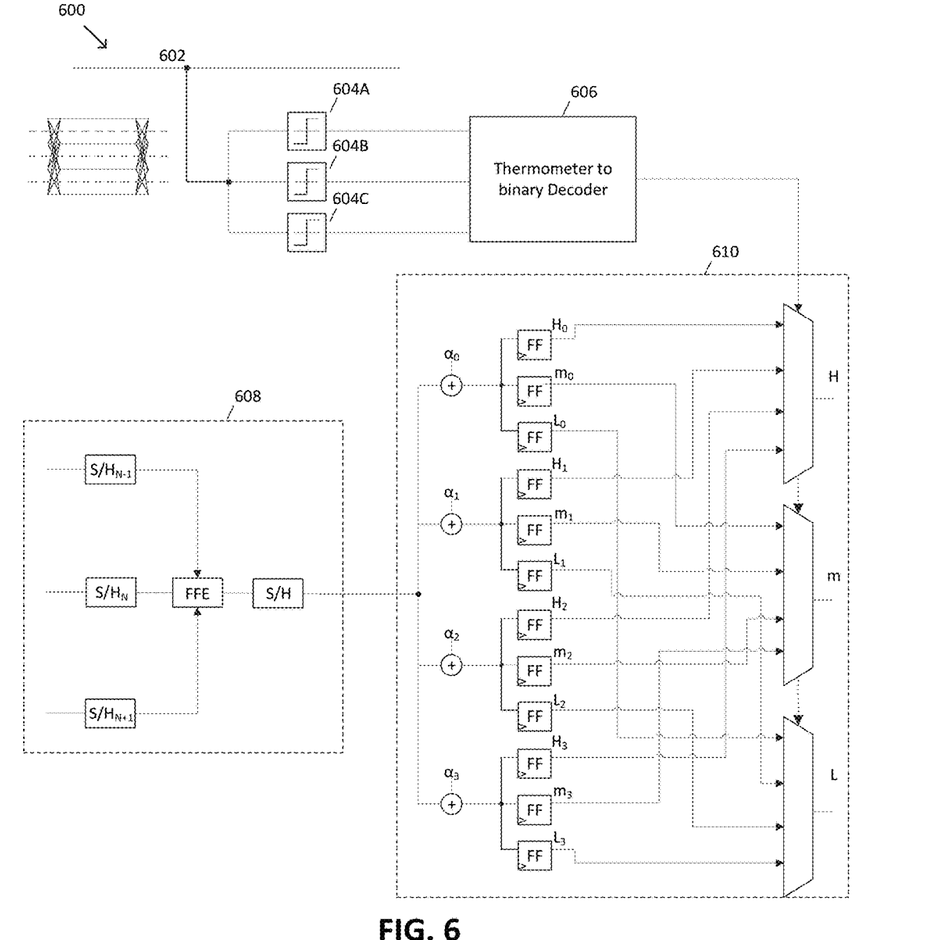
FIG. 6 illustrates a block diagram of a PAM-4 receiver implemented with a look ahead decision equalizer in a subsampling architecture where each eye is equalized independently according to example embodiments of the invention.

FIG. 6 illustrates a block diagram of a PAM-4 receiver 600 that is configured to implement a look ahead decision equalizer in a subsampling architecture where each eye of the eye diagram of an electronic signal is equalized independently according to example embodiments of the invention. An eye diagram 602 of an electronic signal is received from a transmission channel (not shown). The eye diagram 602 may be generated based on a VCSEL transmission and may comprise a high level eye, a mid level eye and a low level eye, similar to those illustrated in the eye diagram of FIG. 3B. Each of the high level eye, the mid level eye and the low level eye in the eye diagram may be processed by eye diagram processors 604A, 604B, and 604C. The eye diagram processors 604A, 604B, and 604C may be configured to convert each of the high level eye, the mid level eye and the low level eye in the eye diagram to a set of thermometer code.

The sets of thermometer code generated by the eye diagram processors 604A, 604B, and 604C may be fed into a thermometer to binary decoder 606 to generate a set of binary code. The set of binary code can be used as the selecting input for the multiplexers in the look ahead decision equalizers 610. The look ahead decision equalizers 610 may comprise a plurality of look ahead decision equalizers. Each look ahead decision equalizer in 610 may be configured to equalize one set of input signals that corresponds to one of the high level eye, the mid level eye and the low level eye in the eye diagram. The FFEs 608 may be configured to process the sets of input signals of the look ahead decision equalizers 610.

FIG. 7 is a flowchart illustrating an example method of operation of a look ahead decision equalizer according to example embodiments of the invention. It will be understood that each block of the flowcharts, and combinations of blocks in the flowcharts, may be implemented by various means. In some example embodiments, certain ones of the operations herein may be modified or further amplified as described below. Moreover, in some embodiments additional optional operations may also be included. It should be appreciated that each of the modifications, optional additions, or amplifications described herein may be included with the operations herein either alone or in combination with any others among the features described herein. The operation illustrated in FIG. 7 may be performed by one of the look ahead decision equalizers illustrated in FIGS. 2 to 6.

In some embodiments, at operation 702, the look ahead decision equalizer may receive an electronic signal. The electronic signal may be an NRZ signal, a PAM-4 signal, a PAM-8 signal, or other PAM signals. The electronic signal encodes a plurality of symbols in a number of amplitude levels in a plurality of pulses in the electronic signal.

At operation 704, for a symbol in the electronic signal, the look ahead decision equalizer estimates multiple symbol values using all possible values of an immediately preceding symbol. The possible values correspond to different amplitude levels of the electronic signal. For example, for an NRZ signal where there are two levels 0 and 1, two estimated symbol values will be calculated. One estimated symbol value will be calculated based on the assumption that the value of the immediately preceding symbol is 0, and the other estimated symbol value will be calculated based on the assumption that the value of the immediately preceding symbol is 1. For a PAM-4 signal where there are four levels 0, 1, 2, and 3, the estimated symbol values will be calculated based on the assumption that the value of the immediately preceding symbol is 0, 1, 2, and 3 respectively. The estimated symbol values may be calculated by a summer circuit using a set of correction coefficients are adjusted based on desired optimization. The results of the estimated symbol values may be stored in a D flip flop, a plurality of D flip flops, or other electronic circuits that are capable of storing an input for at least one clock cycle. For the first symbol in the electronic signal, the actual value may be picked from one of the possible values as a hypothetical actual value. In some embodiments, the hypothetical actual value of the immediately preceding symbol of the first symbol is 0.

At operation 706, the look ahead decision equalizer receives an actual value of the immediately preceding symbol. The actual value of the immediately preceding symbol may be previously calculated by the look ahead decision equalizer and stored in D flip flops or other electronic circuits that are capable of storing an input for at least one clock cycle. In some embodiments, the actual value of the immediately preceding symbol may be received from a different source, such as an FFE.

At operation 708, the look ahead decision equalizer selects an actual estimated symbol value from the multiple symbol values based on the actual value of the immediately preceding symbol. The actual estimated symbol value can be used as the actual value for selecting an estimated symbol value of an immediately subsequent symbol. The actual estimated symbol value may be stored in a D flip flop, a plurality of D flip flops or other electronic circuits that are capable of storing an input for at least one clock cycle. An M-to-1 multiplexer may be used to select the actual estimated symbol value from the multiple symbol values based on the actual value of the immediately preceding symbol. The actual value of the immediately preceding symbol may be used as the selecting input of the multiplexer. The number of M corresponds to the number of amplitude levels. For example, for an NRZ signal, a two-to-one multiplexer may be used. For a PAM-4 signal, a four-to-one multiplexer may be used.

At optional operation 710, the look ahead decision equalizer may use a decision device to equalize the symbol using the actual estimated value of the symbol as input. The decision device may be configured to use various filters, functions, and algorithms to process the symbol. In some embodiments, the decision device may also be configured to equalize a plurality of symbols together. Operations 704 to 708 and optional operation 710 may be repeated for each symbol in the electronic signal.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A method for equalizing a pulse amplitude modulation signal for a receiver in a communication system, comprising:

receiving an analog signal comprising a plurality of eyes;

converting the analog signal into an electronic signal by using a thermometer to binary converter, wherein the electronic signal encodes a plurality of symbols in a number of amplitude levels in a plurality of pulses in the electronic signal;

for each symbol:

estimating multiple symbol values using all possible values of an immediately preceding symbol in parallel by utilizing a distinct flip flop and a distinct summer for each value of the all possible values, wherein each of the distinctive summers are configured to add a corrective coefficient addressing intersymbol interference of the analog signal, and wherein each estimated symbol value is determined using one of the possible values of the immediately preceding symbol, receiving an actual value of the immediately preceding symbol from a feedforward equalizer configured to equalize the immediately preceding symbol, and selecting an actual estimated symbol value from the multiple symbol values based only on the actual value of the immediately preceding symbol.

2. The method of claim 1, wherein the electronic signal is a pulse amplitude modulation signal encoding the plurality of symbols in four amplitude levels, and wherein the four amplitude levels denote 0, 1, 2, and 3.

3. The method of claim 2 further comprising, for each symbol:
estimating a symbol value based on the assumption that the value of the immediately preceding symbol of the symbol is 0;
estimating a symbol value based on the assumption that the value of the immediately preceding symbol of the symbol is 1;
estimating a symbol value in the electronic signal based on the assumption that the value of the immediately preceding symbol of the symbol is 2;
estimating a symbol value in the electronic signal based on the assumption that the value of the immediately preceding symbol of the symbol is 3;
receiving an actual value of the immediately preceding symbol, wherein the actual value is one of 0, 1, 2, or 3; and
selecting an actual estimated symbol value from the multiple symbol values based on the actual value of the immediately preceding symbol.

4. The method of claim 1, wherein estimating each of the multiple symbol values comprises using a flip flop.

5. The method of claim 4, wherein estimating multiple symbol values using all possible values of an immediately preceding symbol is done in parallel, and wherein a distinct flip flop is used for estimating multiple symbol values.

6. The method of claim 1, wherein selecting the estimated symbol value comprises using a multiplexer.

7. The method of claim 1, wherein the actual estimated symbol value is used as the actual value for selecting an estimated symbol value of an immediately subsequent symbol.

8. The method of claim 1, wherein the electronic signal is a non-return to zero signal.

9. The method of claim 1, wherein the electronic signal is generated by a feed-forward equalizer based on another electronic signal.

10. The method of claim 1, wherein the electronic signal is generated based on an analog electronic signal using a thermometer to binary converter, wherein the analog signal comprises a plurality of eyes, each eye encoding a plurality of symbols, and wherein symbols from each eye are equalized separately.

11. An apparatus for equalizing a pulse amplitude modulation signal for a receiver in an electronic communication system, the apparatus configured to:
receive an analog signal comprising a plurality of eyes;
convert the analog signal into an electronic signal by using a thermometer to binary converter, wherein the electronic signal encodes a plurality of symbols in a number of amplitude levels in a plurality of pulses in the electronic signal;
for each symbol:
estimate multiple symbol values using all possible values of an immediately preceding symbol in parallel by utilizing a distinct flip flop and a distinct summer for each value of the all possible values, wherein each of the distinctive summers are configured to add a corrective coefficient addressing inter-symbol interference of the analog signal, and wherein each estimated symbol value is determined using one of the possible values of the immediately preceding symbol,
receive an actual value of the immediately preceding symbol from a feedforward equalizer configured to equalize the immediately preceding symbol, and
select an actual estimated symbol value from the multiple symbol values based only on the actual value of the immediately preceding symbol.

12. The apparatus of claim 11, wherein the electronic signal is a pulse amplitude modulation signal encoding the plurality of symbols in four amplitude levels, and wherein the four amplitude levels denote 0, 1, 2, and 3.

13. The apparatus of claim 12, wherein the apparatus is further configured to:
estimating a symbol value based on the assumption that the value of the immediately preceding symbol of the symbol is 0;
estimating a symbol value based on the assumption that the value of the immediately preceding symbol of the symbol is 1;
estimating a symbol value in the electronic signal based on the assumption that the value of the immediately preceding symbol of the symbol is 2;
estimating a symbol value in the electronic signal based on the assumption that the value of the immediately preceding symbol of the symbol is 3;
receiving an actual value of the immediately preceding symbol, wherein the actual value is one of 0, 1, 2, and 3; and
selecting an estimated symbol value from the multiple symbol values based on the actual value of the immediately preceding symbol.

14. The apparatus of claim 11, wherein the apparatus comprises a plurality of flip flops, and wherein the estimating uses flip flops.

15. The apparatus of claim 11, wherein estimating multiple symbol values using all possible values of an immediately preceding symbol is done in parallel, and wherein a distinct flip flop and a distinct summer is used for estimating multiple symbol values.

16. The apparatus of claim 11, wherein the apparatus comprises a multiplexer, and wherein the multiplexer is used in the selecting.

17. The apparatus of claim 16, wherein the actual estimated symbol value is used as the actual value for selecting an estimated symbol value of an immediately subsequent symbol.

18. The apparatus of claim 17, wherein the electronic signal is a non-return to zero signal.

19. The apparatus of claim 11, further comprising a feed-forward equalizer, and wherein the electronic signal is generated by the feed-forward equalizer based on another electronic signal.

20. The apparatus of claim 11, further comprising an analog signal receiver, a thermometer to binary converter, wherein the electronic signal is generated based on an analog electronic signal received by the analog signal receiver using the thermometer to binary converter, wherein the analog signal comprises a plurality of eyes that each encode a plurality of symbols, and wherein symbols from each eye is equalized separately.

* * * * *